United States Patent
Kim

(10) Patent No.: US 8,934,042 B2
(45) Date of Patent: Jan. 13, 2015

(54) CANDIDATE IMAGE PRESENTING METHOD USING THUMBNAIL IMAGE AND IMAGE SIGNAL PROCESSING DEVICE AND IMAGING DEVICE PERFORMING THE SAME

(75) Inventor: Byeung-Soo Kim, Anyang-si (KR)

(73) Assignee: Mtekvision Co., Ltd., Seoul (KR)

( * ) Notice: Subject to any disclaimer, the term of this patent is extended or adjusted under 35 U.S.C. 154(b) by 604 days.

(21) Appl. No.: 12/902,579

(22) Filed: Oct. 12, 2010

(65) Prior Publication Data

US 2011/0310264 A1 Dec. 22, 2011

(30) Foreign Application Priority Data

Jun. 16, 2010 (KR) .................. 10-2010-0057217

(51) Int. Cl.
| | |
|---|---|
| H04N 5/222 | (2006.01) |
| H04N 5/76 | (2006.01) |
| G06K 9/36 | (2006.01) |
| G06K 9/46 | (2006.01) |
| H04N 5/232 | (2006.01) |

(52) U.S. Cl.
CPC ....... *H04N 5/23293* (2013.01); *H04N 5/23245* (2013.01)
USPC .............. 348/333.05; 348/231.2; 348/231.99; 348/333.01; 348/333.11; 348/333.12; 382/232; 382/166

(58) Field of Classification Search
CPC ............ H04N 5/2356; H04N 5/23293; H04N 5/23245; H04N 1/215; H04N 2201/3247; H04N 5/23216; G03B 15/00; G03B 7/093; G03B 7/095

USPC .............. 348/333.01–333.13, 231.1–231.99; 382/166, 232–253
See application file for complete search history.

(56) References Cited

U.S. PATENT DOCUMENTS

| | | | | |
|---|---|---|---|---|
| 5,172,234 | A | * | 12/1992 | Arita et al. .................. 348/240.2 |
| 5,557,358 | A | * | 9/1996 | Mukai et al. .................. 396/296 |
| 7,349,010 | B2 | * | 3/2008 | Bryant et al. .............. 348/207.1 |
| 8,238,689 | B2 | * | 8/2012 | Inoue ............................ 382/274 |
| 8,243,154 | B2 | * | 8/2012 | Doida ........................ 348/221.1 |
| 8,587,670 | B2 | * | 11/2013 | Wood et al. .............. 348/207.99 |
| 2002/0110354 | A1 | * | 8/2002 | Ikeda et al. ..................... 386/52 |

(Continued)

FOREIGN PATENT DOCUMENTS

| | | | | |
|---|---|---|---|---|
| JP | 2005-55546 A | | 3/2005 | |
| JP | WO2009037925 | * | 3/2009 | ............. H04N 5/225 |

*Primary Examiner* — Chia-Wei A Chen
(74) *Attorney, Agent, or Firm* — Birch, Stewart, Kolasch & Birch, LLP

(57) ABSTRACT

A candidate image presenting method using thumbnail images and an image signal processor and an imaging device performing the candidate image presenting method are provided. The image signal processing device processes a plurality of original image data by frames to generate a plurality of frame image data, generates and firstly outputs a plurality of thumbnail image data corresponding to the plurality of frame image data, and secondly outputs the frame image data corresponding to the thumbnail image data selected on the basis of a selection signal. Accordingly, it is possible to enable an image to be captured in a suitable photographing mode without missing a desired instant by providing a user with thumbnail images obtained by means of photographing operations in various photographing modes for a short time and causing a user to select a desired frame image on the basis of the thumbnail images.

20 Claims, 6 Drawing Sheets

(56) References Cited

U.S. PATENT DOCUMENTS

| | | | |
|---|---|---|---|
| 2004/0032968 A1* | 2/2004 | Andrew et al. | 382/100 |
| 2004/0095480 A1* | 5/2004 | Battles et al. | 348/231.9 |
| 2004/0196376 A1* | 10/2004 | Hosoda et al. | 348/207.1 |
| 2005/0123205 A1* | 6/2005 | Son et al. | 382/233 |
| 2005/0202804 A1* | 9/2005 | Silverbrook et al. | 455/411 |
| 2006/0098111 A1* | 5/2006 | Goh et al. | 348/333.05 |
| 2006/0140620 A1* | 6/2006 | Fujii | 396/287 |
| 2006/0204141 A1* | 9/2006 | Modrall et al. | 382/305 |
| 2006/0221223 A1* | 10/2006 | Terada | 348/333.05 |
| 2006/0231626 A1* | 10/2006 | Pan et al. | 235/454 |
| 2007/0118550 A1* | 5/2007 | Yang et al. | 707/102 |
| 2007/0172226 A1* | 7/2007 | Nakata et al. | 396/374 |
| 2007/0229695 A1* | 10/2007 | Kato | 348/333.12 |
| 2008/0043108 A1* | 2/2008 | Jung et al. | 348/207.1 |
| 2008/0063287 A1* | 3/2008 | Klamer et al. | 382/232 |
| 2008/0079834 A1* | 4/2008 | Chung et al. | 348/333.12 |
| 2008/0219654 A1* | 9/2008 | Border et al. | 396/89 |
| 2008/0225155 A1* | 9/2008 | Ebato et al. | 348/333.05 |
| 2008/0246858 A1* | 10/2008 | Omori | 348/231.99 |
| 2009/0160963 A1* | 6/2009 | Kim | 348/220.1 |
| 2009/0245666 A1* | 10/2009 | Yamashina | 382/235 |
| 2009/0262207 A1* | 10/2009 | Yumiki et al. | 348/222.1 |
| 2009/0279844 A1* | 11/2009 | Shimazaki | 386/70 |
| 2010/0194962 A1* | 8/2010 | Kato | 348/333.05 |
| 2010/0194963 A1* | 8/2010 | Terashima | 348/333.11 |
| 2010/0271531 A1* | 10/2010 | Ueda et al. | 348/333.01 |
| 2011/0090366 A1* | 4/2011 | Yoon et al. | 348/231.2 |
| 2011/0176031 A1* | 7/2011 | Liu | 348/229.1 |
| 2012/0062598 A1* | 3/2012 | Furuya et al. | 345/651 |
| 2012/0274830 A1* | 11/2012 | Kameyama et al. | 348/333.02 |

* cited by examiner

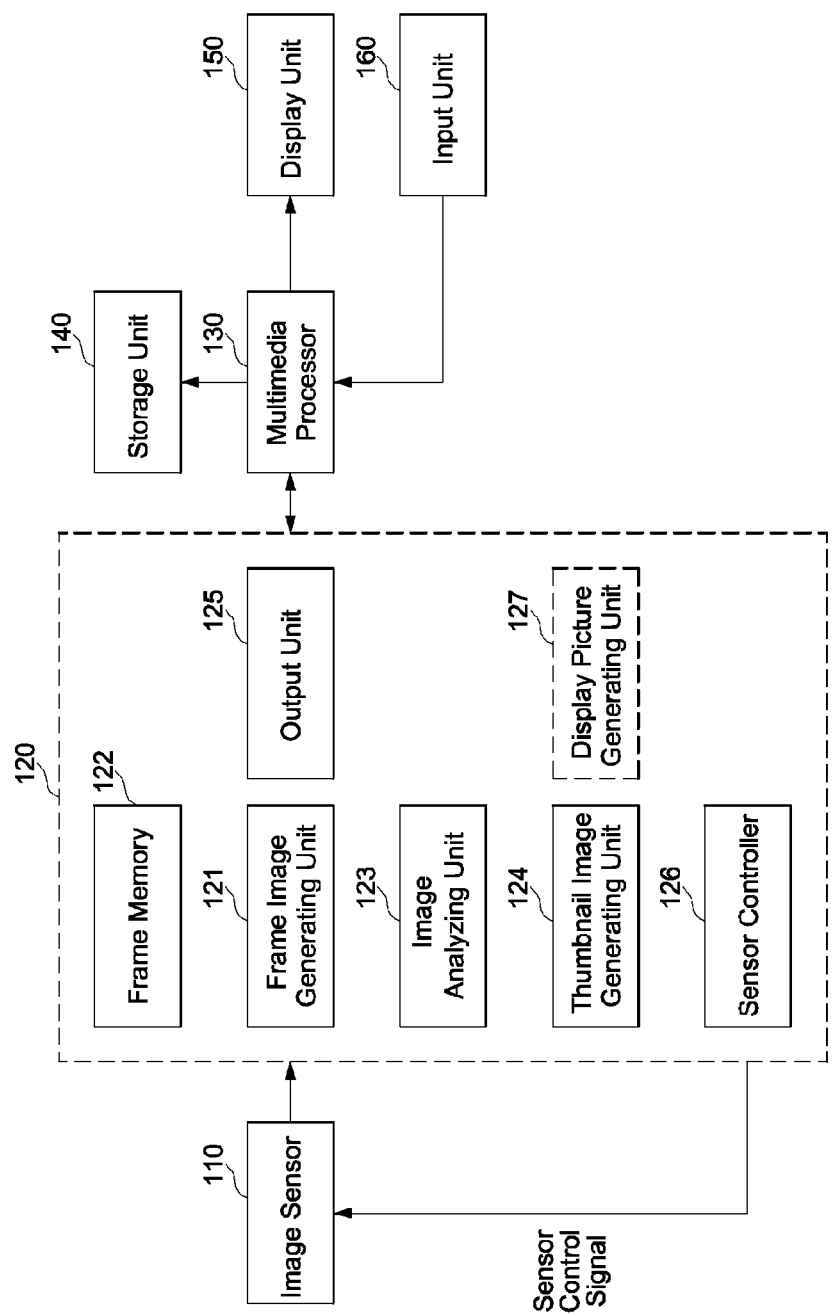

FIG. 2

| Type | ISO | Light Measurement | E V | W B | Definition | Chroma | Flash |
|---|---|---|---|---|---|---|---|
| None | AUTO | Center | 0 EV | AUTO | 0 | 0 | Auto On/Off |
| Portrait | AUTO | Center | 0 EV | AUTO | -1 | 0 | Auto On/Off |
| Landscape | AUTO | Matrix | 0 EV | AUTO | +1 | +1 | Off |
| Sport | Sport | Center | 0 EV | AUTO | 0 | 0 | Off |
| Party/Indoor | ISO200 | Center | 0 EV | AUTO | 0 | +1 | Auto On/Off |
| Beach/Snow | ISO50 | Center | 1 EV | AUTO | 0 | +1 | Off |
| Sunset | AUTO | Center | 0 EV | Daylight | 0 | 0 | Off |
| Dawn | AUTO | Center | 0 EV | CWF | 0 | 0 | Off |
| Fall | AUTO | Center | 0 EV | AUTO | 0 | +2 | Off |
| Night | Night | Center | 0 EV | AUTO | 0 | 0 | Off |
| Against Light | AUTO | Spot/Center | 0 EV | AUTO | 0 | 0 | On/Off |
| Fire | ISO50 | Center | 0 EV | AUTO | 0 | 0 | Off |
| Text | AUTO | Center | 0 EV | AUTO | +2 | 0 | Auto On/Off |
| Candle | AUTO | Center | 0 EV | Daylight | 0 | 0 | Off |

| Type | ISO | Light Measurement | E V | W B | Definition | Chroma | Flash |
|---|---|---|---|---|---|---|---|
| Night1 | ISO10 | Center | 0 EV | AUTO | 0 | 0 | Off |
| Night2 | ISO30 | Center | 0 EV | AUTO | 0 | 0 | Off |
| Night3 | ISO50 | Center | 0 EV | AUTO | 0 | 0 | Off |
| Night4 | ISO100 | Center | 0 EV | AUTO | 0 | 0 | Off |
| Night5 | ISO150 | Center | 0 EV | AUTO | 0 | 0 | Off |
| Night6 | ISO200 | Center | 0 EV | AUTO | 0 | 0 | Off |
| Night7 | ISO300 | Center | 0 EV | AUTO | 0 | 0 | Off |
| Night8 | ISO400 | Center | 0 EV | AUTO | 0 | 0 | Off |
| Night9 | ISO500 | Center | 0 EV | AUTO | 0 | 0 | Off |

CANDIDATE IMAGE PRESENTING METHOD USING THUMBNAIL IMAGE AND IMAGE SIGNAL PROCESSING DEVICE AND IMAGING DEVICE PERFORMING THE SAME

CROSS REFERENCE

This application is based on and claims priority under 35 USC 119 from Korean Patent Application No. 10-2010-0057217, filed on Jun. 16, 2010.

BACKGROUND

1. Field of the Invention

The present invention relates to a candidate image presenting method using a thumbnail image and an image signal processing device and an imaging device performing the method.

2. Description of the Related Art

Recently, an imaging device having a large capacity has been mounted on mobile terminals such as mobile communication terminal, PDA (Personal Digital Assistants), and PMP (Portable Multimedia Player) and thus it is possible to capture an image with quality equivalent to that of a dedicated digital camera by the use of the mobile terminals.

The imaging device mounted on the mobile terminals includes elements such as an image sensor, an image signal processor, and a multimedia processor.

In capturing an image, a user adjusts photographing attributes such as ISO sensitivity, exposure time, and diaphragm aperture ratio and selects photographing conditions most suitable for a subject.

However, when a user is not a specialist, the user has difficulty in adjusting the photographing attributes. Recent imaging devices provide various photographing modes such as portrait, landscape, sport, night portrait, party, beach/snow, sunset, museum, fire, and against light and cause users to select a photographing mode suitable for a current situation, thereby capturing an image with proper exposure and small noise.

In this case, when a user selects a specific photographing mode for photographing, only an image in the selected photographing mode is captured. Accordingly, there is a problem that the user should search for a desired photographing mode to select the photographing mode suitable for the current situation while sequentially applying the photographing modes in a preview picture.

The situation which the user wants to photograph may vary while searching for the suitable photographing mode, thereby often missing the instant of which the image is wanted to capture.

SUMMARY

An advantage of some aspects of the invention is that it provides a candidate image presenting method using thumbnail images, which can enable an image to be captured in a suitable photographing mode without missing a desired instant by providing a user with thumbnail images obtained by means of photographing operations in various photographing modes for a short time and causing a user to select a desired frame image on the basis of the thumbnail images, and an image signal processing device and an imaging device performing the candidate image presenting method.

Another advantage of some aspects of the invention is that it provides a candidate image presenting method using thumbnail images, which can help a user select a suitable image by changing sizes and arrangement order of the thumbnail images on the basis of the analysis result of images captured in various photographing modes, and an image signal processing device and an imaging device performing the candidate image presenting method.

Another advantage of some aspects of the invention is that it provides a candidate image presenting method using thumbnail images, which can efficiently utilize a storage space by finally storing only an image selected from images captured in various photographing modes and reduce an amount of data transmitted between an image signal processor and a multimedia processor to enhance signal processing speed, and an image signal processing device and an imaging device performing the candidate image presenting method.

Other advantages of the invention will be easily understood from the following description.

According to an aspect of the invention, there is provided an image signal processing device which performs a predetermined signal process on original image data supplied from an image sensor to present candidate images using thumbnail images.

The image signal processing device includes: a frame image generating unit that generates a plurality of frame image data by processing original image data sequentially input from the image sensor by frames; a frame memory that stores the plurality of frame image data; a thumbnail image generating unit that generates a plurality of thumbnail image data by scaling the plurality of frame image data; and an output unit that firstly outputs the plurality of thumbnail image data and reads and secondly outputs the frame image data corresponding to the thumbnail image data, which is selected on the basis of a user's selection signal out of the plurality of thumbnail image data, from the frame memory. Here, the original image data are sequentially generated by causing the image sensor to apply different photographing attributes by frames on the basis of a sensor control signal input from the image signal processing device.

The image signal processing device may further include an image analyzing unit that generates image analysis information from the plurality of frame image data using a predetermined image analysis method. The thumbnail image generating unit may determine one or more thumbnail attributes of an arrangement order and a size of the plurality of thumbnail images on the basis of the image analysis information. The image signal processing device may further include a display picture generating unit that generates a display picture in which all or a part of the plurality of thumbnail images are arranged depending on the thumbnail attribute and the output unit may output the display picture to a multimedia processor at the subsequent stage.

The image signal processing may further include a sensor controller that controls the operation of the image sensor by a plurality of photographing modes.

According to another aspect of the invention, there is provided an imaging device including: an input unit that receives a request signal and a selection signal from a user; an image sensor that outputs original image data generated by performing a photographing operation in different photographing modes by frames in response to the request signal; an image signal processing device that processes the original image data by frames to generate a plurality of frame image data, generates and firstly output a plurality of thumbnail image data corresponding to the plurality of frame image data, and secondly outputs frame image data corresponding to the thumbnail image data selected by the selection signal; a display unit that displays the plurality of thumbnail image data firstly output; a storage unit that stores the frame image data secondly output; and a multimedia processor that supplies the plurality of thumbnail image data firstly output from the image signal processing device to the display unit for display and supplies the frame image data secondly output from the image signal processing device to the storage unit.

The image signal processing device may include: a frame image generating unit that generates the plurality of frame image data by processing the original image data sequentially input from the image sensor by frames; a frame memory that stores the plurality of frame image data; a thumbnail image generating unit that generates the plurality of thumbnail image data by scaling the plurality of frame image data; and an output unit that firstly outputs the plurality of thumbnail image data and reads and secondly outputs the frame image data corresponding to the thumbnail image data, which is selected on the basis of the selection signal from the user out of the plurality of thumbnail image data, from the frame memory.

The image signal processing device may further include an image analyzing unit that generates image analysis information from the plurality of frame image data using a predetermined image analysis method. The thumbnail image generating unit may determine one or more thumbnail attributes of an arrangement order and a size of the plurality of thumbnail images on the basis of the image analysis information.

The image signal processing device may further include a display picture generating unit that generates a display picture in which all or a part of the plurality of thumbnail images are arranged depending on the thumbnail attribute, the output unit may output the display picture to the multimedia processor, and the multimedia processor may supply the display picture to the display unit for display.

The multimedia processor may include a display picture generating unit that generates a display picture in which all or a part of the plurality of thumbnail images are arranged depending on the thumbnail attribute, and the multimedia processor may supply the display picture to the display unit for display.

The image signal processing device may further include a sensor controller that controls the operation of the image sensor by a plurality of photographing modes set in response to the request signal.

The frame image generating unit may encode the original image data in a predetermined format and store the encoded original image data in the frame memory.

The image sensor may generate the original image data by changing one or more photographing attributes of ISO sensitivity, exposure value, flash ON/OFF, photometry, white balance, definition, chroma, gamma control, and lens shading compensation for each of the plurality of photographing modes.

The multimedia processor may encode the secondly-output frame image data in a predetermined format and store the encoded frame image data in the storage unit.

On the other hand, according to another aspect of the invention, there are provided a candidate image presenting method using thumbnail images, which is performed by an image signal processing device connected between an image sensor and a multimedia processor, and a recording medium having recorded thereon a program for carrying out the candidate image presenting method.

The candidate image presenting method includes the steps of: (a) processing a plurality of original image data supplied from the image sensor by a plurality of photographing modes set on the basis of a user's request signal by frames and generating and storing a plurality of frame image data; (b) scaling the plurality of frame image data to generate a plurality of thumbnail image data; (c) outputting the plurality of thumbnail image data to the multimedia processor; and (d) outputting the frame image data corresponding to the thumbnail image data, which is selected on the basis of a user's selection signal output the plurality of thumbnail image data, to the multimedia processor.

The step of (b) may include the steps of: generating image analysis information from the plurality of frame image data using a predetermined image analysis method; and determining one or more thumbnail attributes of an arrangement order and a size of the plurality of thumbnail images on the basis of the image analysis information.

The step of (c) may include the steps of: generating a display picture in which all or a part of the plurality of thumbnail images are arranged depending on the thumbnail attribute; and outputting the display picture to the multimedia processor at the subsequent stage.

The candidate image presenting method may further include, before the step of (a), a step of controlling the operation of the image sensor by a plurality of photographing modes set in response to the request signal.

Other aspects, features, and advantages will become apparent from the accompanying drawings, the appended claims, and the detailed description.

According to the above-mentioned configurations, it is possible to enable an image to be captured in a suitable photographing mode without missing a desired instant by providing a user with thumbnail images obtained by means of photographing operations in various photographing modes for a short time and causing a user to select a desired frame image on the basis of the thumbnail images.

It is also possible to help a user select a suitable image by changing sizes and arrangement order of the thumbnail images on the basis of the analysis result of images captured in various photographing modes.

It is possible to efficiently utilize a storage space by finally storing only an image selected from images captured in various photographing modes and to reduce an amount of data transmitted between an image signal processor and a multimedia processor to enhance signal processing speed.

BRIEF DESCRIPTION OF THE DRAWINGS

FIG. 1 is a diagram schematically illustrating the configuration of an imaging device according to an embodiment of the invention.

FIG. 2 is a table illustrating photographing modes and photographing attributes of the photographing modes according to an embodiment of the invention.

DESCRIPTION OF EXEMPLARY EMBODIMENTS

Figures 3, 4:
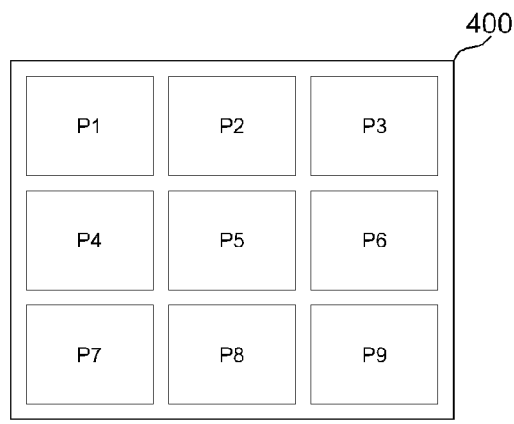
FIG. 3 is a table illustrating sub photographing modes in a single photographing mode and photographing attributes of the sub photographing modes according to an embodiment of the invention.
FIG. 4 is a diagram illustrating a display picture according to an embodiment of the invention.

The invention can be variously modified in various forms and specific embodiments will be described and shown in the drawings. However, the embodiments are not intended to limit the invention, but it should be understood that the invention includes all the modifications, equivalents, and replacements belonging to the spirit and the technical scope of the invention. When it is determined that detailed description of known techniques involved in the invention makes the gist of the invention obscure, the detailed description will not be made.

Terms such as "first" and "second" can be used to describe various elements, but the elements are not limited to the terms. The terms are used only to distinguish one element from another element.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Terms, "unit", "module", and the like, described in the specification mean a unit for performing at least one function or operation and can be embodied by hardware, by software, or by a combination of hardware and software.

When it is determined that detailed description of known techniques involved in the invention unnecessarily makes the gist of the invention obscure, the detailed description will not be made.

Hereinafter, exemplary embodiments of the invention will be described in detail with reference to the accompanying drawings.

Figure 5:
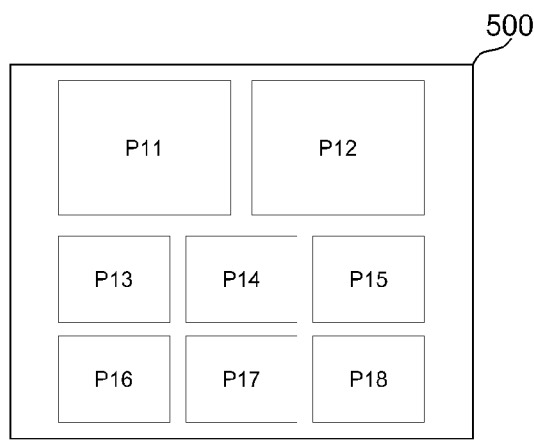
FIG. 5 is a diagram illustrating another display picture according to the embodiment of the invention.

FIG. 1 is a diagram schematically illustrating the configuration of an imaging device according to an embodiment of the invention. FIG. 2 is a table illustrating photographing modes and photographing attributes of the photographing modes according to an embodiment of the invention. FIG. 3 is a table illustrating sub photographing modes in a single photographing mode and photographing attributes of the sub photographing modes according to an embodiment of the invention. FIG. 4 is a diagram illustrating a display picture according to an embodiment of the invention. FIG. 5 is a diagram illustrating another display picture according to the embodiment of the invention.

An imaging device according to an embodiment of the invention can be embodied as an electronic apparatus having a camera function, and may be a device that is mounted on a mobile terminal such as a mobile communication terminal, a PDA, and a PMP and that performs a camera function or a device that performs a camera function like a dedicated digital camera.

When a candidate image presenting mode (best scene select mode) in which a user can be allowed to select one or more images of images captured in various photographing modes is set, the imaging device according to the embodiment of the invention captures images in various predetermined photographing modes, firstly provides thumbnail images as candidate images, and finally stores a frame image corresponding to the thumbnail image selected by the user.

Referring to FIG. 1, the imaging device according to an embodiment of the invention includes an image sensor 110, an image signal processing device 120, a multimedia processor 130, a storage unit 140, a display unit 150, and an input unit 160.

The image sensor 110 converts an optical image of a subject transmitted through a lens into an electrical signal and outputs original image data. The image sensor 110 includes an any of small photosensitive diodes called pixels. The pixels sense the brightness and wavelengths of different light emitted from subjects, read them as electrical signals, and amplify the electrical signals to processable levels.

In the image sensor 110, plural pixels are arranged in a two-dimensional structure as a lattice pattern, and each pixel converts the brightness of incident light into an electrical signal. By measuring the electrical signals, the intensity of light incident on each pixel can be known and used to construct an image of a pixel unit.

For example, the image sensor 110 can be constructed by a CCD (Charge Coupled Device) or CMOS (Complementary Metal-Oxide Semiconductor) image sensor depending on the method of forming and transmitting signals using electrons and holes.

The image sensor 110 can employ different conversion methods or different factors used in the conversion depending on the photographing attributes such as ISO sensitivity, exposure value, flash ON/OFF, photometry, white balance, definition, and chroma in the course of converting an optical image of a subject into original image data. By changing factors such as a speed of a shutter disposed in an optical path from a subject to the image sensor 110, an aperture ratio of a lens, and an analog gain of the signal output from the image sensor 110, the exposure value of the photographing attributes can be changed. The photographing attributes can be adjusted by the use of a control signal from a sensor controller 126 to be described later.

The imaging device according to the embodiment of the invention can be set to a candidate image presenting mode in response to a user's request signal via the input unit 160. When the imaging device is set to the candidate image presenting mode, a control signal for sequentially capturing images in various photographing modes using a predetermined photographing method or a photographing method selected by a user is output. The image sensor 110 sequentially generates the original image data corresponding to the photographing modes in response to the input control signal.

Here, as shown in FIG. 2, examples of the photographing modes include none, portrait, landscape, sport, party/indoor, beach/snow, sunset, dawn, fall, night, against light, fire, text, and candle.

The respective photographing modes can be set so that one or more of the photographing attributes such as ISO sensitivity, exposure value (EV), flash ON/OFF, photometry, white balance (WB), definition, and chroma, have different setting values. For example, in the night mode, the ISO sensitivity is set to night, the photometry is set to center photometry, the exposure value is set to 0 EV, the white balance is set to auto, the definition is set to 0, the chroma is set to 0, and the flash ON/OFF is set to OFF.

Each photographing mode can be divided into sub photographing modes. For example, as shown in FIG. 3, the night mode can be divided into 9 sub night modes Night1 to Night9. Here, in the sub night modes, only the ISO sensitivity which is one of the photographing attributes is set to different values and the other photographing attributes are set to the same values. The other photographing modes may be set to different values.

When the imaging device is set to the candidate image presenting mode in response to the user's request signal, one or more of the basic photographing modes shown in FIG. 2 are selected and the image sensor 110 sequentially captures images, whereby the original image data corresponding to the selected photographing mode is sequentially generated.

Alternatively, as shown in FIG. 3, one or more of the sub photographing modes of one of the basic photographing modes may be selected and the image sensor 110 may sequentially capture images so as to sequentially generate the original image data corresponding to the selected sub photographing modes.

Referring to FIG. 1 again, the image signal processing device 120 is supplied with the original image data corresponding to plural photographing modes and being output from the image sensor 110 and performs a designated signal process.

Examples of the general signal processes performed by the image signal processing device 120 include a black level compensating process, a noise reducing process, a lens shading compensating process, and a color interpolating process.

By the black level compensating process, it is possible to prevent the deterioration in characteristics such as image excitation which is noise resulting from a black level from which a predetermined signal level is detected due to dark current generated in the image sensor 110 even when light is not applied. By the noise reducing process, it is possible to reduce the influence of noise such as dark current noise resulting from the dark current which is generated in the image sensor 110. By the lens shading compensating process, it is possible to compensate for a lens shading phenomenon such as color distortion resulting from a difference in transmittance between the center portion and the edge portion of the lens of the image sensor 110 and signal level reduction depending on pixel positions. By the color interpolating process, it is possible to obtain pixel values of red, green, and blue for each pixel in an image signal having a Bayer pattern.

As shown in FIG. 1, the image signal processing device 120 according to the embodiment of the invention includes a frame image generating unit 121, a frame memory 122, an image analyzing unit 123, a thumbnail image generating unit 124, an output unit 125, and a sensor controller 126. In some embodiments, the image signal processing device 120 may further include a display picture generating unit 127.

The frame image generating unit 121 generates plural frame image data obtained by dividing the original image data input from the image sensor 110 into frames on the basis of a vertical synchronization signal and an effective data enable signal.

One frame image is generated from one photographing mode. Accordingly, when the original image data is divided into frames, the respective frames correspond to the original image data obtained in different photographing modes. That is, when the imaging device is set to the candidate image presenting mode, images are captured in various predetermined photographing modes, the original image data corresponding to various photographing modes are sequentially from the image sensor 110, and the frame image generating unit 121 generates the frame image data divided by the photographing modes.

Here, the frame image generating unit 121 may firstly perform pre-processes such as color space transformation, filtering, and down sampling on the original image data.

The frame image generating unit 121 may performs an encoding process so as to compress the frame image data in a predetermined format (for example, one of JPEG and GIF) to reduce the magnitude of the frame image data to be stored in the frame memory 122. For example, the frame image generating unit 121 performs discrete cosine transformation (DCT), quantization, and entropy encoding on the image data by blocks defined in advance by JPEG encoding, and generates the frame image data in the JPEG format. Of course, the encoding process on the image data may be performed by a multimedia processor. The JPEG encoding process is obvious to those skilled in the art and is thus not described herein.

The frame image data generated by the frame image generating unit 121 is stored in the frame memory 122. The frame memory 122 is a space for storing the frame image data output from the frame image generating unit 121 under the control of the controller and may be a nonvolatile memory device such as DRAM and SRAM from which the stored data are deleted by the turning-off of a power source.

The plural frame image data are correlated with identifiers identifying the frame image data by the photographing modes and are stored in the frame memory 122.

The image analyzing unit 123 generates image analysis information including image definition of the corresponding frame image data by applying a predetermined image analyzing technique (for example, an edge detecting technique) on the frame image data stored in the frame memory data 122. The image analyzing technique of analyzing dots, lines, edges, and the like of an image using characteristic information (for example, one or more of luminance and brightness) is obvious to those skilled in the art and is thus not described.

The thumbnail image generating unit 124 scales the respective frame image data to generate thumbnail image data with a predetermined size. The thumbnail image generating unit 124 includes an image scaler that scales the frame image data to generate the thumbnail image data.

The thumbnail attributes including one or more of the size and the arrangement order of thumbnail images can be changed on the basis of the image analysis information generated by the image analyzing unit 123.

For example, the size of the thumbnail image data corresponding to the frame image data, the definition of which is determined excellent as the image analysis result, out of the plural frame image data may be greater than a default size or than the sizes of the other thumbnail images. Alternatively, the thumbnail image corresponding to the frame image data, the definition of which is determined excellent as the image analysis result, out of the plural frame images may be arranged with priority higher than those of the other thumbnail images.

In this way, by changing the size or the arrangement order of the thumbnail images, it is possible to make the thumbnail image corresponding to the frame image, the definition of which is determined excellent as the image analysis result, out of the plural frame images be more visible to a user, thereby helping the user's selection.

The thumbnail image data generated by the thumbnail image generating unit 124 are also stored in the frame memory 122. The thumbnail image data may be stored in correlation with the corresponding frame image data and the thumbnail image data may be correlated with the identifiers correlated with the frame image data.

The display picture generating unit 127 generates a display picture in which all or a part of the thumbnail images corresponding to the thumbnail image data generated by the thumbnail image generating unit 124 are arranged.

For example, as shown in FIG. 4, 9 thumbnail images having the same size may be arranged in a display picture 400. In this case, the arrangement order of the thumbnail images can be determined by the thumbnail image generating unit 124 as described above. For example, the thumbnail images may be arranged in the order of P1, P2, . . . , and P9 on the basis of the priority. Alternatively, the thumbnail images may be arranged in the order of P5, P2, P4, P6, P8, . . . so that the thumbnail image having the highest priority is disposed at the center of the display picture 400 so as to enhance the possibility of the user's selection.

Alternatively, as shown in FIG. 5, 8 thumbnail images may be arranged in a display picture 500. In this case, the arrangement order of the thumbnail images may be determined by the thumbnail image generating unit 124 as described above. Here, by disposing the thumbnail images having the higher priority in P11 and P12 with a size greater than those of the other thumbnail images, it is possible to enhance the possibility of the user's selection.

In FIG. 5, the sizes of the thumbnail images arranged at positions in the display picture 500 are fixed in the display picture 500. However, in some embodiments, the sizes of the thumbnail images may be determined depending on the thumbnail image size which is one of the thumbnail attributes changed by the thumbnail image generating unit 124.

When one or more of the thumbnail images arranged in the display picture is requested to delete by a user, the display picture generating unit 127 may reconstruct the display picture by deleting the corresponding thumbnail image data and changing the arrangement order and/or the size using the other thumbnail image data.

The controller controls the operations of the elements of the image signal processing device 120.

The controller includes a sensor controller 126 controlling the operations of one or more of the image signal processing device 120 and the image sensor 110 and an output controller (not shown) controlling the output of the frame image data or the thumbnail image data.

When the candidate image presenting mode is set by the user's request signal, the sensor controller 126 generates and outputs a control signal for controlling one or more of the image sensor 110 and the image signal processing device 120 so as to perform a photographing operation in one or more photographing modes predetermined in the candidate image presenting mode or selected by the user.

In this case, a sensor control signal for controlling the image sensor 110 is supplied to the image sensor 110 so as to adjust one or more of the photographing attributes so that the image sensor 110 captures images in one or more photographing modes predetermined in the candidate image presenting mode. The photographing attributes of the image sensor 110 to be adjusted include one or more of ISO sensitivity, exposure value, flash ON/OFF, photometry, white balance, definition, chroma, gamma control, and lens shading compensation (LSC).

Although not shown in FIG. 1, an internal control signal for controlling the image signal processing device 120 is supplied to the elements of the image signal processing device 120 so as to perform the functions of photometry and white balance or to improve the definition and the chroma and serves to adjust one or more of the photographing attributes so that the image signal processing device 120 performs the photographing operation in one or more photographing modes predetermined in the candidate image presenting mode. The photographing attributes of the image signal processing device 120 to be adjusted include one or more of ISO sensitivity, exposure value, flash ON/OFF, photometry, white balance, definition, chroma, gamma control, lens shading compensation, strength adjustment of noise filter (YNR (Y(luminance) noise filter) and CNR (Color Noise Filter)), and lens deviation adjustment. Here, the lens deviation adjustment may be applied differently depending on color temperatures.

The output unit 125 firstly outputs the thumbnail image data to the multimedia processor 130 generated by the thumbnail image generating unit 124 under the control of the output controller so that the display unit 150 displays the thumbnail images. The output unit 125 reads the frame image data corresponding to the thumbnail image data selected by the user's selection signal, which is input from the input unit 160, from the frame memory 122 and secondly outputs the read frame image data. Here, the user's selection signal is a signal representing what image to finally store after the user checks the thumbnail images corresponding to the firstly-output thumbnail image data, and can be input from the input unit 160. This signal may be input from the display unit 150 when the display unit 150 is a touch screen.

The output unit 125 outputs the display picture generated by the display picture generating unit 127 to the multimedia processor 130. All or a part of the thumbnail images generated by the thumbnail image generating unit 124 are arranged in the display picture on the basis of one or more of the size and the arrangement order determined depending on the thumbnail attributes. Accordingly, the multimedia processor 130 supplies the display picture to the display unit 150 for display.

The multimedia processor 130 supplies the thumbnail image data from the output unit 125 to the display unit 150 to display the thumbnail image data. Here, one or more thumbnail images corresponding to the thumbnail image data are included in a single display picture. When the thumbnail image data corresponding to the number of thumbnail images included in the single display picture are supplied, the multimedia processor 130 supplies all the thumbnail image data to the display unit 150 so as to display the thumbnail images at a time. In this case, the multimedia processor 130 may further include a display picture generating unit (not shown). The display picture generating unit generates a display picture in which the thumbnail image data supplied from the output unit 125 are arranged on the basis of the thumbnail attributes as shown in FIG. 4 or 5 and supplies the display picture to the display unit 150 to display the display picture. The display picture generating unit has the same function as the display picture generating unit 127.

Alternatively, the multimedia processor 130 may supply the display picture from the output unit 125 to the display unit 150 so as to display the display picture at once.

The multimedia processor 130 stores the frame image data, which is selected by the user's selection signal input via the input unit and is supplied from the output unit 125, in the storage unit 140. Here, when the frame image data is data encoded through the encoding process, the frame image data can be stored in the storage unit 140 at once. An encoder encoding the frame image data in a predetermined format when the frame image data is non-encoded data is disposed in the multimedia processor 130, whereby the storage space of the storage unit 140 can be efficiently used.

Thereafter, the multimedia processor 130 decodes the frame image data stored in the storage unit 140 and supplies the decoded frame image data to the display unit 150 so as to display the frame image data.

The storage unit 140 stores the frame image data supplied from the multimedia processor 130 or the thumbnail image data. The storage unit 140 may be embodied by a nonvolatile memory device (such as EEPROM (Electrically Erasable Programmable Read-Only Memory) and flash memory) built in the imaging device and/or a detachable nonvolatile memory card.

The display unit 150 displays the operation state of the imaging device, the thumbnail images with different photographing modes applied thereto, the display picture in which the thumbnail images are arranged, and the frame image data selected by the user.

The input unit 160 is means for receiving operating information from the user and can be embodied by one or more buttons. When the display unit 150 is embodied by a touch screen, the display unit 150 and the input unit 160 may be embodied in a body. The operating information such as the user's request signal and selection signal input from the input unit 160 is input to the multimedia processor 130 or a baseband chip (not shown), and the multimedia processor 130 or the baseband chip sends a control signal to the image signal processing device 120 so that the image signal processing device 120 performs the above-mentioned operations.

Figure 6:
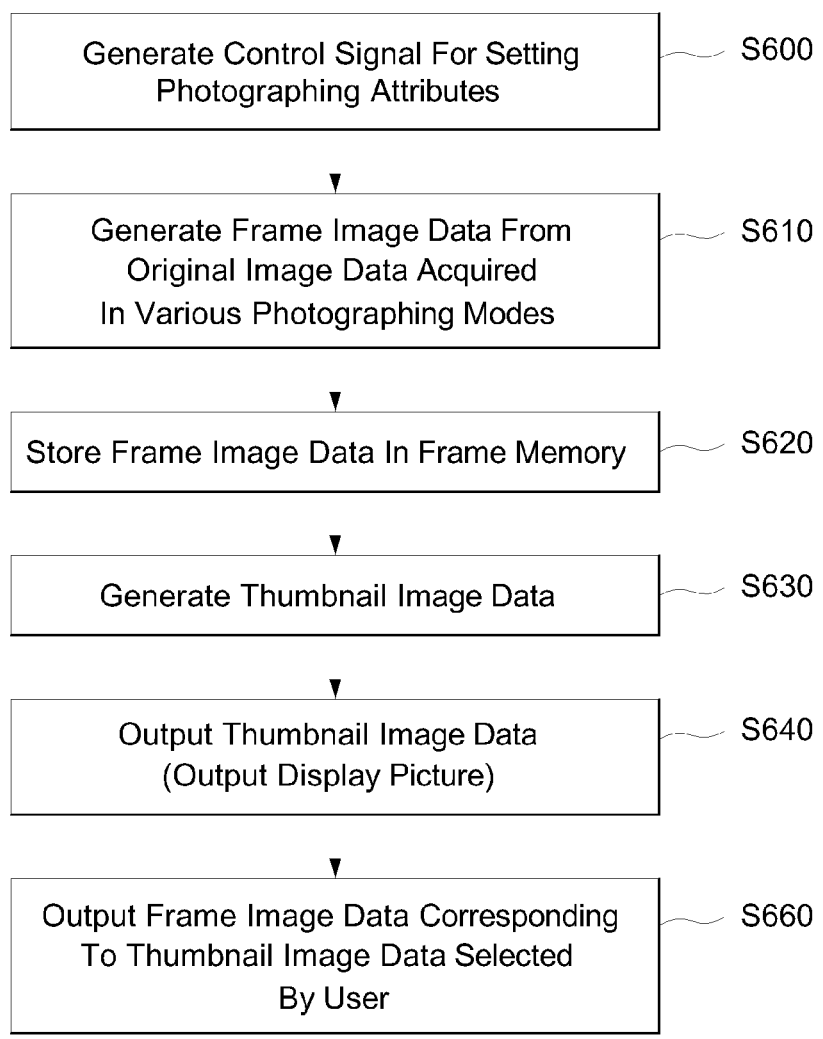
FIG. 6 is a flow diagram illustrating the flow of a frame image selecting method using thumbnail images in an image signal processing device according to an embodiment of the invention.
Figure 7:
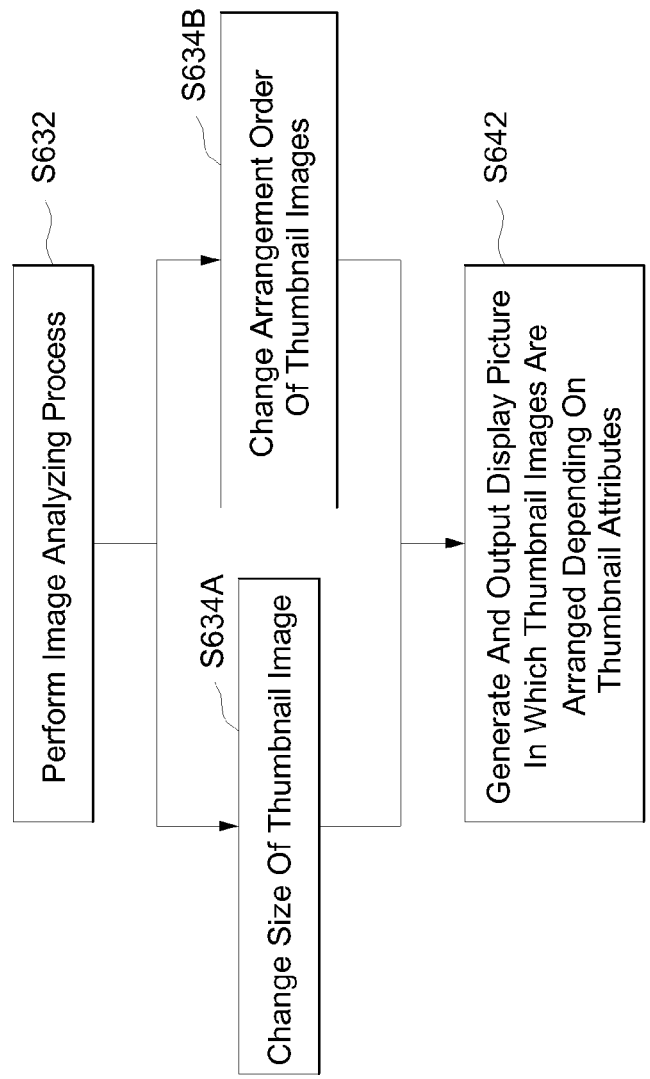
FIG. 7 is a flow diagram illustrating the flow of a thumbnail attribute determining procedure according to an embodiment of the invention.

FIG. 6 is a flow diagram illustrating the flow of a candidate image presenting method using thumbnail images in the image signal processing device according to an embodiment of the invention. FIG. 7 is a flow diagram illustrating a thumbnail attribute determining procedure according to an embodiment of the invention.

In describing the candidate image presenting method using thumbnail images with reference to FIGS. 6 and 7, it is assumed that the imaging device is set to the candidate image presenting mode.

Referring to FIG. 6, the sensor controller 126 generates and outputs the control signal for controlling the photographing attributes corresponding to one or more photographing modes predetermined in the candidate image presenting mode or selected by the user in step S600.

The photographing modes to be set may include one or more of the basic photographing modes shown in FIG. 2 and the sub photographing modes shown in FIG. 3.

The basic photographing modes may include one or more of none, portrait, landscape, sport, party/indoor, beach/snow, sunset, dawn, fall, night, against light, fire, text, and candle. Alternatively, in some embodiments, as shown in FIG. 3, when one (the night mode in FIG. 3) of the photographing modes is firstly selected and then the candidate image presenting mode is set in the selected photographing mode, various sub photographing modes may be provided by changing the attribute values of some of the predetermined photographing attributes in the selected photographing mode.

Therefore, the control signal controls one or more photographing attributes of the image sensor 110 and the image signal processing device 120 so as to perform the photographing operation in various basic photographing modes or sub photographing modes.

In step S610, the frame image generating unit 121 divides the original image data input from the image sensor 110 into frames to generate the frame image data. Here, the division into frames is performed to distinguish the images based on different photographing modes. Here, before step S610, the image sensor 110 sequentially changes the photographing attributes on the basis of the control signal, performs the photographing operation in various photographing modes to generate the original image data corresponding to the number of photographing modes, and supplies the generated original image data to the frame image generating unit 121.

In step S620, the frame image data generated by the frame image generating unit 121 is stored in the frame memory 122.

In step S630, the thumbnail image generating unit 124 scales the original image data supplied from the image sensor 110 to generate the thumbnail image data with predetermined size and format.

In generating the thumbnail image data, the attributes such as the size and the arrangement order of the thumbnail images can be changed.

Referring to FIG. 7, in step S632, the image analyzing unit 123 generates the image analysis information including the image definition and the like by applying a predetermined image analyzing technique to the frame image data stored in the frame memory 122.

In steps S634a and S634b, the thumbnail image generating unit 124 changes the size and the arrangement order of the thumbnail images on the basis of the image analysis information. For example, the thumbnail images corresponding to the plural frame images captured in the plural photographing modes may have a size corresponding to the definition of the frame images or may have an arrangement order corresponding to the definition of the frame images.

Referring to FIG. 6 again, in step S640, the output unit 125 outputs the generated thumbnail image data. As described with reference to FIG. 7, in some embodiments, the output unit 125 may output the display picture including the thumbnail image data and being generated by the display picture generating unit 127 (step S642).

The multimedia processor 130 connected to the image signal processing device 120 supplies the display picture including one or more thumbnail images supplied from the output unit 125 to the display unit 150 to display the display picture. The multimedia processor 130 supplies the information (thumbnail image information) on the thumbnail image, which is selected by the user using the input unit 160 out of the thumbnail images in the displayed display picture, to the image signal processing device 120.

In step S650, the output unit 125 reads and outputs the frame image data corresponding to the thumbnail image information selected by the user from the frame memory 122.

The multimedia processor 130 stores the frame image data supplied from the output unit 125 in the storage unit 140.

When the selected frame image data is stored in the storage unit 140, the frame memory 122 deletes the stored frame image data to guarantee the storage space, thereby using a memory with a small storage capacity to reduce the manufacturing cost.

Since only the selected frame image data is stored in the storage unit 140, it is not necessary to store the entire frame image data acquired by the image sensor 110, thereby efficiently using the storage space.

It is possible to reduce an amount of data to be transmitted between the image signal processing device 120 and the multimedia processor 130, thereby enhancing the signal processing speed.

The above-mentioned candidate image presenting method using a thumbnail image may be carried out in a time-series automated procedure by a software program built in the image signal processor. Codes and code segments of the program will be easily obtained by programmers skilled in the art. The program can be stored in a computer-readable recording medium and can be read and executed by a computer to embody the above-mentioned method. Examples of the recording medium include a magnetic recording medium, an optical recording medium, and a carrier wave medium.

While the invention has been described with reference to the exemplary embodiments, it will be understood by those skilled in the art that the invention can be modified and changed in various forms without departing from the spirit and scope of the invention described in the appended claims.

What is claimed is:

1. An image signal processing device which performs a predetermined signal process on original image data supplied from an image sensor, comprising:
    a sensor controller that controls an operation of the image sensor by a plurality of photographing modes, and generates and outputs a control signal that controls photographic attributes corresponding to at least one of the plurality of photographing modes that are predetermined in a candidate image presenting mode or one selected by a user;
    a frame image generating unit that generates a plurality of frame image data by processing the original image data sequentially input from the image sensor by frames;
    a frame memory that stores the plurality of frame image data;
    a thumbnail image generating unit that generates a plurality of thumbnail image data by respectively scaling the plurality of frame image data, at least one of the plurality of frame image data being encoded to create at least one of the plurality of thumbnail image data in a compressed format for output;
    an output unit that firstly outputs the plurality of thumbnail image data and reads and secondly outputs a frame image data corresponding to a thumbnail image data, which is selected on the basis of a user's selection signal out of the plurality of thumbnail image data, from the frame memory; and
    a multimedia processor that determines whether the frame image data output by the user's selection signal is in the compressed format and, in response to determining that the frame image data output by the user's selection signal is not in the compressed format, encodes the frame image data upon the user's selection signal to output in the compressed format, while storing the frame image data without further encoding in response to determining that the frame image data is in the compressed format,
    wherein the original image data are sequentially generated by causing the image sensor to apply different photographing attributes by the frames on the basis of a sensor control signal input from the image signal processing device, and
    wherein the thumbnail image generating unit determines one or more thumbnail attributes of an arrangement order and a size of the plurality of thumbnail images on the basis of an image analysis information.

2. The image signal processing device according to claim 1, further comprising an image analyzing unit that generates the image analysis information from the plurality of frame image data using a predetermined image analysis method.

3. The image signal processing device according to claim 1, further comprising a display picture generating unit that generates a display picture in which all or a part of the plurality of thumbnail images are arranged depending on the one or more thumbnail attributes,
    wherein the output unit outputs the display picture to a multimedia processor at a subsequent stage.

4. The image signal processing device according to claim 1, wherein a thumbnail image having the highest priority is disposed at a center of the display picture.

5. The image signal processing device according to claim 1, wherein a thumbnail image having the highest priority is displayed in the biggest size among the plurality of thumbnail image data.

6. An imaging device comprising:
    an input unit that receives a request signal and a selection signal from a user;
    an image sensor that outputs original image data generated by performing a photographing operation in different photographing modes by frames in response to the request signal;
    a sensor controller that controls an operation of the image sensor by a plurality of photographing modes, and generates and outputs a control signal that controls photographic attributes corresponding to at least one of the plurality of photographing modes that are predetermined in a candidate image presenting mode or one selected by the user;
    an image signal processing device that processes the original image data by the frames to generate a plurality of frame image data, generates and firstly outputs a plurality of thumbnail image data corresponding to the plurality of frame image data, and secondly outputs a frame image data corresponding to a thumbnail image data selected by the selection signal, the image signal processing device including a thumbnail image generating unit that determines one or more thumbnail attributes of an arrangement order and a size of the plurality of thumbnail images on the basis of an image analysis information, and at least one of the plurality of frame image data being encoded to create at least one of the plurality of thumbnail image data in a compressed format;
    a display unit that displays the plurality of thumbnail image data firstly output;
    a storage unit that stores the frame image data secondly output; and
    a multimedia processor that supplies the plurality of thumbnail image data firstly output from the image signal processing device to the display unit for display and supplies the frame image data secondly output from the image signal processing device to the storage unit and that determines whether the frame image data output by the user's selection signal is in the compressed format and, in response to determining that the frame image data output by the user's selection signal is not in the compressed format, encodes the frame image data upon the user's selection signal to output in the compressed format, while storing the frame image data without further encoding in response to determining that the frame image data is in the compressed format.

7. The imaging device according to claim 6, wherein the image signal processing device further includes:
    a frame image generating unit that generates the plurality of frame image data by processing the original image data sequentially input from the image sensor by the frames;
    a frame memory that stores the plurality of frame image data;
    the thumbnail image generating unit that further generates the plurality of thumbnail image data by scaling the plurality of frame image data; and
    an output unit that firstly outputs the plurality of thumbnail image data and reads and secondly outputs a frame image data corresponding to a thumbnail image data, which is selected on the basis of the selection signal from the user out of the plurality of thumbnail image data, from the frame memory.

8. The imaging device according to claim 7, wherein the frame image generating unit encodes the original image data in a predetermined format and stores the encoded original image data in the frame memory.

9. The imaging device according to claim 7, wherein the image signal processing device further includes an image analyzing unit that generates the image analysis information from the plurality of frame image data using a predetermined image analysis method.

10. The imaging device according to claim 9, wherein the image signal processing device further includes a display picture generating unit that generates a display picture in which all or a part of the plurality of thumbnail images are arranged depending on the one or more thumbnail attributes,
wherein the output unit outputs the display picture to the multimedia processor, and
wherein the multimedia processor supplies the display picture to the display unit for display.

11. The imaging device according to claim 9, wherein the multimedia processor includes a display picture generating unit that generates a display picture in which all or a part of the plurality of thumbnail images are arranged depending on the one or more thumbnail attributes, and
wherein the multimedia processor supplies the display picture to the display unit for display.

12. The imaging device according to claim 11, wherein a thumbnail image having the highest priority is disposed at a center of the display picture.

13. The imaging device according to claim 11, wherein a thumbnail image having the highest priority is displayed in the biggest size among the plurality of thumbnail images.

14. The imaging device according to claim 6, wherein the image sensor generates the original image data by changing one or more photographing attributes of ISO sensitivity, exposure value, flash ON/OFF, photometry, white balance, definition, chroma, gamma control, and lens shading compensation for each of the plurality of photographing modes.

15. The imaging device according to claim 6, wherein the multimedia processor encodes the secondly-output frame image data in a predetermined format and stores the encoded frame image data in the storage unit.

16. A candidate image presenting method using thumbnail images, which is performed by an image signal processing device connected between an image sensor and a multimedia processor, the method, comprising:
(a) generating and outputting a control signal that controls photographic attributes corresponding to at least one of a plurality of photographing modes that are predetermined in a candidate image presenting mode or one selected by a user;
(b) processing a plurality of original image data supplied from the image sensor by the plurality of photographing modes set on the basis of a user's request signal by frames and generating and storing a plurality of frame image data;
(c) scaling the plurality of frame image data to generate a plurality of thumbnail image data, the scaling including encoding at least one of the plurality of frame image data to create at least one of the plurality of thumbnail image data in a compressed format;
(d) outputting the plurality of thumbnail image data to the multimedia processor; and
(e) outputting a frame image data corresponding to a thumbnail image data, which is selected on the basis of a user's selection signal out of the plurality of thumbnail image data, to the multimedia processor, the outputting including determining whether the frame image data output by the user's selection signal is in the compressed format and, in response to determining that the frame image data output by the user's selection signal is not in the compressed format, encoding the frame image data upon the user's selection signal to output in the compressed format, while outputting the frame image data without further encoding in response to determining that the frame image data is in the compressed format,
wherein the step of (c) further includes determining one or more thumbnail attributes of an arrangement order and a size of the plurality of thumbnail images on the basis of an image analysis information.

17. The candidate image presenting method according to claim 16, wherein the step of (c) further includes:
generating the image analysis information from the plurality of frame image data using a predetermined image analysis method.

18. The candidate image presenting method according to claim 17, wherein the step of (d) includes:
generating a display picture in which all or a part of the plurality of thumbnail images are arranged depending on the one or more thumbnail attributes; and
outputting the display picture to the multimedia processor at a subsequent stage.

19. The candidate image presenting method according to claim 18, wherein a thumbnail image having the highest priority is disposed at a center of the display picture.

20. The candidate image presenting method according to claim 18, wherein a thumbnail image having the highest priority is displayed in the biggest size among the plurality of thumbnail images.

* * * * *